(12) United States Patent
Senda

(10) Patent No.: US 8,598,242 B2
(45) Date of Patent: Dec. 3, 2013

(54) EXPANDED POLYPROPYLENE COPOLYMER RESIN PARTICLES

(75) Inventor: Kenichi Senda, Osaka (JP)

(73) Assignee: Kaneka Corporation, Osaka (JP)

( * ) Notice: Subject to any disclaimer, the term of this patent is extended or adjusted under 35 U.S.C. 154(b) by 264 days.

(21) Appl. No.: 13/262,495

(22) PCT Filed: Mar. 30, 2010

(86) PCT No.: PCT/JP2010/002293
§ 371 (c)(1),
(2), (4) Date: Sep. 30, 2011

(87) PCT Pub. No.: WO2010/113471
PCT Pub. Date: Oct. 7, 2010

(65) Prior Publication Data
US 2012/0029101 A1 Feb. 2, 2012

(30) Foreign Application Priority Data
Apr. 2, 2009 (JP) .................. 2009-090347

(51) Int. Cl.
C08J 9/16 (2006.01)
C08J 9/18 (2006.01)
C08J 9/22 (2006.01)
C08J 9/00 (2006.01)
B29C 44/44 (2006.01)
C08F 210/00 (2006.01)

(52) U.S. Cl.
USPC .......... 521/60; 521/56; 521/59; 521/134; 521/142; 521/143; 526/160; 526/170; 526/348; 526/351; 526/943

(58) Field of Classification Search
USPC ........ 521/56, 59, 60, 134, 142, 143; 526/348, 526/170, 351, 160, 943
See application file for complete search history.

(56) References Cited

U.S. PATENT DOCUMENTS

| 4,908,393 A | 3/1990 | Arai et al. |
| 5,032,620 A | 7/1991 | Arai et al. |

(Continued)

FOREIGN PATENT DOCUMENTS

| JP | 1-242638 A | 9/1989 |
| JP | 6-240041 A | 8/1994 |

(Continued)

OTHER PUBLICATIONS

International Search Report of PCT/JP2010/002293, mailing date May 11, 2010.

(Continued)

Primary Examiner — Randy Gulakowski
Assistant Examiner — Kara Boyle
(74) Attorney, Agent, or Firm — Westerman, Hattori, Daniels & Adrian, LLP

(57) ABSTRACT

Disclosed is an expanded polypropylene copolymer resin particle whose base resin is a polypropylene random copolymer resin having a melting point of not more than 145° C., the base resin having a H/W ratio of not more than 8 where H (%) is a maximum height of an elution peak and W (° C.) is a peak width at half a height of the peak in an elution curve obtained from a differential value of eluted content measured by cross fractionation chromatography, and a ratio (Mw/Mn) of a weight-average molecular weight (Mw) and a number-average molecular weight (Mn) being not less than 3.5 in a molecular weight distribution measurement of a whole of eluted components. With such an expanded polypropylene copolymer resin particle, it is possible to provide expanded polypropylene copolymer resin particles which are capable of producing an in-mold expansion-molded article with a low molding heating vapor pressure, and which causes few deformation or shrinkage of an obtained in-mold expansion-molded article (i.e. having a broad molding heating temperature range) even if the in-mold expansion molding is carried out with a high molding heating vapor pressure and has a low decrease in physical properties such as compression strength.

2 Claims, 2 Drawing Sheets

(56) References Cited

U.S. PATENT DOCUMENTS

| | | | |
|---|---|---|---|
| 5,468,781 A | 11/1995 | Sugano et al. | |
| 6,593,382 B2 | 7/2003 | Kiguchi et al. | |
| 2002/0143076 A1 | 10/2002 | Kiguchi et al. | |
| 2006/0222849 A1* | 10/2006 | Matsumura et al. | 428/407 |
| 2007/0270516 A1 | 11/2007 | Iwamoto et al. | |

FOREIGN PATENT DOCUMENTS

| | | |
|---|---|---|
| JP | 7-258455 A | 10/1995 |
| JP | 2002-226621 A | 8/2002 |
| JP | 2005-139349 A | 6/2005 |
| JP | 2006-022138 A | 1/2006 |
| WO | 2006/016478 A1 | 2/2006 |

OTHER PUBLICATIONS

Notification of Translation of the International Preliminary Report on Patentability (Forms PCT/IB/373) of International Application No. PCT/JP2010/002293 mailed Nov. 24, 2011 with Forms PCT/IB/373 and PCT/ISA/237.

* cited by examiner ns chemical resistance, heat resistance, and distortion recovery rate after the article is compressed, as compared to an in-mold expansion-molded article made of expanded polystyrene resin particles. Furthermore, the in-mold expansion-molded article made of the expanded polypropylene resin particles shows better dimensional accuracy, heat resistance, and compression strength as compared to an in-mold expansion-molded article made of expanded polyethylene resin particles. From these characteristics, the in-mold expansion-molded article made of the expanded polypropylene resin particles are used for various uses such as heat-insulating material, cushion packaging material, interior members for automobiles, and core material for a car bumper.

EXPANDED POLYPROPYLENE COPOLYMER RESIN PARTICLES

TECHNICAL FIELD

The present invention relates to expanded polypropylene copolymer resin particles. More specifically, the present invention relates to expanded polypropylene copolymer resin particles suitably used as raw material of an in-mold expansion-molded article.

BACKGROUND ART

An in-mold expansion-molded article obtained by filling expanded polypropylene resin particles into a mold and thereafter heating the mold with water vapor to mold the resin particles, is characteristic in its selectability of shape, its lightweight properties, its heat-insulating properties and like properties, each of which are merits of the in-mold expansion-molded article. Moreover, upon comparison with in-mold expansion-molded articles made of similar expanded synthetic resin particles, the in-mold expansion-molded article made of the expanded polypropylene resin particles shows better chemical resistance, heat resistance, and distortion recovery rate after the article is compressed, as compared to an in-mold expansion-molded article made of expanded polystyrene resin particles. Furthermore, the in-mold expansion-molded article made of the expanded polypropylene resin particles shows better dimensional accuracy, heat resistance, and compression strength as compared to an in-mold expansion-molded article made of expanded polyethylene resin particles. From these characteristics, the in-mold expansion-molded article made of the expanded polypropylene resin particles are used for various uses such as heat-insulating material, cushion packaging material, interior members for automobiles, and core material for a car bumper.

On the other hand, in order to mutually fuse the expanded polypropylene resin particles together in the mold to obtain the in-mold expansion-molded article, there is the need to heat the particles at a higher temperature than that for heating the expanded polystyrene resin particles or for heating the expanded polyethylene resin particles. That is to say, there is the need of a high molding heating vapor pressure. This causes the need of a mold and a molding machine which can tolerate high pressure, and also causes a problem of high vapor cost required for the molding.

Most molding machines for in-mold expansion molding of expanded polypropylene resin particles have a pressure resistance upper limit of approximately 0.4 MPa. The expanded propylene resin particles used for the in-mold expansion molding is resin which have properties corresponding to this limit; typically, a propylene random copolymer having a melting point of 140° C. to 150° C. is used. However, due to the substantial increase of fuel prices these days, there are demands for further reduction of the molding heating vapor pressure.

One available method of lowering the molding heating vapor pressure is a method of using a propylene random copolymer resin including more comonomer content and having a further lower melting point (e.g. a method of using a propylene random copolymer having a melting point of not more than 140° C.). However, the melting point of a propylene random copolymer generally has a positive correlation to resin rigidity; if a resin having a low melting point is used, the rigidity of the resin decreases. This causes physical properties of the resin such as compression strength to decrease when the resin is made into an in-mold expansion-molded article, and further shrinking and deformation of the in-mold expansion-molded article tends to occur more remarkably.

On the contrary, if a propylene random copolymer resin including less comonomer content and having a high melting point is used to achieve a high rigidity, the melting point of the resin increases, which causes the molding heating vapor pressure required for obtaining a good in-mold expansion-molded article to increase. Hence, if a higher rigidity is required, there is the need to use a highly pressure-resistant molding machine and mold. This causes an increase in equipment costs and further an increase in molding processing costs due to the increase in utility usage mainly of water vapor and the like.

In order to solve these problems, proposals have been made to use a propylene/1-butene random copolymer or a propylene/ethylene/1-butene random terpolymer (Patent Literature 1, Patent Literature 2), or a metallocene polypropylene (Patent Literature 3) as resin having a low melting point while having a relatively high resin rigidity as compared to the melting point. However, the propylene random copolymer including 1-butene comonomer is slow in the polymerization speed of 1-butene. This causes poor polymerization productivity, and also has a problem that the resin cost is high. Moreover, with the metallocene polypropylene, its catalytic promoter is expensive, while the resin cost is also high. Furthermore, melt fractures easily generate when preparing mini pellets by an extruding granulation technique. This causes a problem of having low extrusion productivity.

CITATION LIST

Patent Literature

Patent Literature 1
Japanese Patent Application Publication, Tokukaihei, No. 1-242638 A
Patent Literature 2
Japanese Patent Application Publication, Tokukaihei, No. 7-258455 A
Patent Literature 3
Japanese Patent Application Publication, Tokukaihei, No. 6-240041 A

SUMMARY OF INVENTION

Technical Problem

An object of the present invention is to provide expanded polypropylene copolymer resin particles which can produce an in-mold expansion-molded article with a lower molding heating vapor pressure, and which causes few deformation or shrinkage of an obtained in-mold expansion-molded article (i.e. having a broad molding and heating temperature range) and has a low decrease in physical properties such as compression strength even if the in-mold expansion molding is carried out with a high molding heating vapor pressure.

Solution to Problem

As a result of carrying out diligent study to attain the object, the inventor of the present invention found that by use of expanded polypropylene copolymer resin particles whose base resin is a polypropylene random copolymer resin having (i) a melting point of not less than 120° C. but not more than 145° C., (ii) a broad composition distribution of the copolymerization monomer, and (iii) a broad molecular weight distribution, it is possible to carry out in-mold expansion molding with a lower molding heating vapor pressure. Further, the inventor found that even if the in-mold expansion molding is carried out with a high molding heating vapor pressure, few shrinking or deformation of an obtained in-mold expansion-molded article is caused (i.e. the obtained in-mold expansion-molded article has a broad molding heating temperature range). Moreover, the inventor found that the decrease in physical properties such as compression strength of the obtained in-mold expansion-molded article is reduced.

Namely, a first aspect of the present invention relates to an expanded polypropylene copolymer resin whose base resin is a polypropylene random copolymer resin having a melting point of not less than 120° C. but not more than 145° C., the base resin having a ratio H/W of not more than 8, where H (%) is a maximum height of an elution peak and W (° C.) is a peak width at half the height of the peak, each in an elution curve obtained from an eluted amount measured by cross fractionation chromatography, and a ratio (Mw/Mn) of weight-average molecular weight (Mw) to number-average molecular weight (Mn) in a molecular weight distribution measurement of a whole of eluted components being not less than 3.5.

A second aspect of the present invention relates to an in-mold expansion-molded polypropylene resin article obtained by having the expanded polypropylene copolymer resin particle be subjected to in-mold expansion molding, the in-mold expansion-molded polypropylene resin article having a density of not less than 10 kg/m³ but not more than 300 kg/m³.

Effect of the Invention

An expanded polypropylene copolymer resin particle allows for producing an in-mold expansion-molded article with a lower molding heating vapor pressure, and even if the in-mold expansion molding is carried out with a high molding heating vapor pressure, few deformation or shrinking is caused to the obtained in-mold expansion-molded article (i.e. the molding heating temperature range of the in-mold expansion-molded article is broad) and the decrease in physical properties such as compression strength or the like when the expanded polypropylene copolymer resin particle is made into the in-mold expansion-molded article is low.

DESCRIPTION OF EMBODIMENTS

Figure 1:
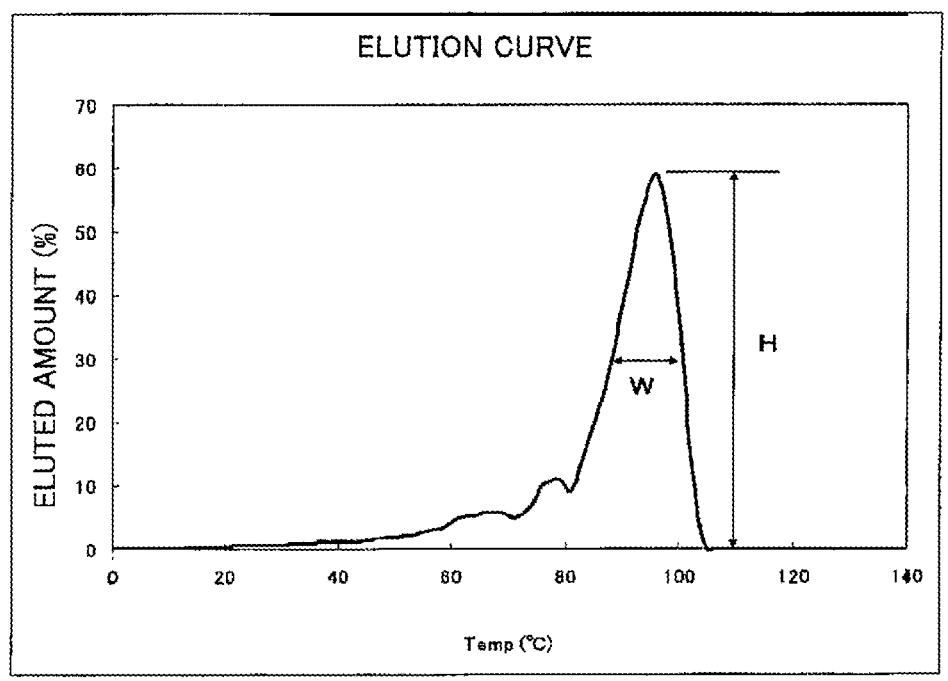
FIG. 1 is a view showing an elution curve obtained by cross fractionation chromatography, according to Example 1 of the present invention.

A polypropylene random copolymer resin used as a base a resin of the present invention is a resin containing propylene as its main component that serves as a monomer, and contains ethylene and/or an α-olefin other than propylene as its copolymerization component. For instance, a propylene/ethylene random copolymer, a propylene/1-butene random copolymer, or a propylene/ethylene/1-butene random terpolymer may be suitably used. Preferably, the propylene/ethylene random copolymer is used in view of versatility and low cost.

In a case where the polypropylene random copolymer resin used as the base resin of the present invention is the propylene-ethylene random copolymer, it is preferable that an ethylene content of the copolymer is not less than 1% by weight but not more than 6% by weight, and is further preferably not less than 2% by weight but not more than 5% by weight. From a viewpoint of producing an in-mold molded article with a lower molding heating vapor pressure, it is preferable to use a low melting resin containing a greater ethylene content.

It is preferable that the polypropylene random copolymer resin of the present invention has a melting point of not less than 120° C. but not more than 145° C., and is more preferably not less than 125° C. but not more than 145° C. The polypropylene random copolymer resin having a melting point of less than 120° C. tends to cause difficulty in production with a typical Ziegler-Natta catalyst. If the melting point exceeds 145° C., the molding heating vapor pressure may exceed 0.35 MPa at a time when the expanded polypropylene copolymer resin particles are subjected to in-mold expansion molding. This makes it difficult for the in-mold expansion molding to be carried out with already-available polypropylene-molding machines, while further a required amount of vapor tends to increase.

The melting point in the present invention is a melting peak temperature in a DSC curve obtained by carrying out measurement with a differential scanning calorimeter (DSC). The following describes how the DSC curve is obtained. Resin particles by an amount of 4 mg to 6 mg are melted by raising the temperature of the resin particles from 40° C. to 220° C. at a rate of 10° C./min, and thereafter the resin particles are lowered in its temperature from 220° C. to 40° C. at a rate of 10° C./min, which crystallizes the resin. Subsequently, the resin particles are raised in temperature from 40° C. to 220° C. at a rate of 10° C./min. A melting peak temperature obtained in the second temperature rise of the DSC curve serves as the melting temperature.

It is preferable that a melt flow rate (hereinafter, abbreviated as "MFR") of the polypropylene random copolymer resin of the present invention be not less than 2 g/10 min but not more than 20 g/10 min, and is further preferably not less than 3 g/10 min but not more than 15 g/10 min. If the MFR of the polypropylene random copolymer resin is less than 2 g/10 min, the expandability tends to decrease, and if the MFR exceeds 20 g/10 min, cells in the expanded particles break, thereby tending to cause generation of a continuous cell. The MFR is a value measured with a MFR measuring device described in JIS-K7210, under the following conditions: an orifice of 2.0959±0.005 mmφ, an orifice length of 8.000±0.025 mm, a load of 2160 g, and at 230±0.2° C.

The polypropylene random copolymer resin according to the present invention may be used in combination with another thermoplastic resin that can be in combination with a polypropylene resin, mixed in a degree in which properties of the polypropylene resin is not lost. For instance, a low density polyethylene, a linear low density polyethylene, polystyrene, polybutene, or an ionomer may be used in combination.

The expanded polypropylene random copolymer resin particles according to the present invention are characteristic in that a composition distribution of the base resin is broad. The "composition distribution" means a distribution of a copolymerization component (e.g. ethylene) in a copolymer. Usually, in a polypropylene random copolymer, a molecular chain containing many copolymerization components has a low crystallinity since crystallization is hindered, thus having a low melting point. On the other hand, a molecular chain containing few copolymer components has high crystallinity, thereby having a high melting point.

The "composition distribution is broad" denotes that the distribution of the copolymerization component content is broad, which together causes the melting point distribution to become broad.

The composition distribution is evaluated by cross fractionation chromatography (hereinafter, may be abbreviated as "CFC") by measuring a change in an eluted amount to a solvent (e.g. o-dichlorobenzene) that is used when raising the temperature of the polypropylene random copolymer in a temperature rising elution fractionation (hereinafter, may be abbreviated as "TREF") section.

In the present invention, a H/W ratio of the base resin is not more than 8, and preferably not more than 7, where H (%) is a maximum height of an elution peak and W (° C.) is a peak width at half the maximum height of the elution peak, each in an elution curve obtained from an eluted amount (hereinafter, may be denoted as "% with respect to a whole of eluted amount") measured by cross fractionation chromatography. The smaller a value of the H/W ratio, the broader the elution curve is; this shows that the composition distribution is broad. If the H/W ratio is greater than 8, the composition distribution is too narrow. In this case, when the resin is made to have a low melting point (when the copolymerization component amount is made great at the time of copolymerization), a high melting point component becomes insufficient in amount. As a result, the resin tends to shrink/deform when the molding heating vapor pressure is raised. The low melting point component also becomes insufficient in amount, which tends to make it difficult to decrease the molding heating vapor pressure. Moreover, if the H/W ratio is greater than 8, it tends to be difficult to prevent physical properties such as compression strength and the like from decreasing.

The composition distribution of the polypropylene random copolymer resin according to the present invention may be adjusted by a polymerization process, a polymerization catalyst, and the like. However, it is possible to broaden the composition distribution of a resin having a narrow composition distribution by blending a low melting point resin (containing a greater amount of copolymerization component) and a high melting point resin (containing a fewer amount of copolymerization component), and it is possible to broaden the composition distribution by having a large difference between the melting points of the two resins.

Furthermore, it is preferable that the expanded polypropylene copolymer resin particles according to the present invention has a ratio (Mw/Mn) of a weight-average molecular weight (Mw) to a number-average molecular weight (Mn) of not less than 3.5, preferably not less than 4.0, in a molecular weight distribution measurement of a whole of eluted components by the CFC measurement of the base resin. If the Mw/Mn ratio obtained by the CFC measurement of the polypropylene random copolymer resin is less than 3.5, the low molecular weight component becomes too small in amount that it would cause the molding heating pressure to rise, while the high molecular weight component also becomes too small in amount that it would cause shrinking and deformation to a greater degree at the time of molding at high pressure.

The molecular weight distribution of the polypropylene random copolymer resin according to the present invention may be adjusted by a polymerization process, a polymerization catalyst, or like method. Alternatively, it is possible to broaden the molecular weight distribution by blending a resin having a high MFR (having a low molecular weight) with a resin having a low MFR (having a high molecular weight). The larger the difference between the MFRs of the blended two resins, the broader the molecular weight distribution is.

In a case where a sole polypropylene random copolymer is used as a base resin, a small molecular weight distribution ratio (Mw/Mn) tends to achieve a narrower composition distribution of the base resin. This is because the low molecular weight component tends to contain more of the copolymerization component, and the high molecular weight component tends to contain less of the copolymerization component.

The cross fractionation chromatography (CFC) used in the present invention is a device which can simultaneously measure a composition distribution and a molecular weight distribution by directly connecting the temperature rising elution fractionation (TREF) section with a gel permeation chromatography (GPC) section which measures the molecular weight distribution.

Devices and measurement conditions used in the present invention are as listed below.

Device: Cross fractionation Chromatograph CFC T-150A (manufactured by Mitsubishi Petrochemical Co., Ltd.)
Detector: Infrared spectrophotometer 1ACVF (manufactured by MIRAN)
Detection wavelength: 3.42 μm
GPC column: Shodex AT-806MS×3 columns (manufactured by Showa Denko K.K.)
Column temperature: 135° C.
Column calibration: monodispersed polystyrene (manufactured by Tosoh Corporation)
Molecular weight calibration method: universal calibration/polyethylene conversion
Eluting solvent: o-dichlorobenzene
Flow rate: 1.0 mL/min
Sample concentration: 30 mg/10 mL
Injection amount: 500 μL
Temperature lowering time: 135 minutes (135° C. to 0° C.: crystallization rate of 1° C./min), thereafter kept for 60 minutes
Elution groups: 0, 20, 40, 50, 60, 70, 75, 80, 83, 86, 89, 92, 95, 98, 101, 104, 106, 108, 110, 112, 114, 116, 118, 120, 122, 124, 126, 130, 135° C. (29 fractions)

More specifically, a sample solution (o-dichlorobenzene solution of polypropylene copolymer resin) is injected into a sample solution injection section at 135° C., and thereafter is cooled from 135° C. to 0° C. at a temperature lowering rate of 1° C./min in the TREF section. This causes the sample to crystallize inside the TREF section. Subsequently, after the temperature of the TREF section is kept at 0° C. for 60 minutes, the sample is successively eluted at the following elution group temperatures and is guided from the TREF section to the GPC column, where an infrared detector is used to obtain a GPC chromatogram (molecular weight distribution).

An obtained GPC chromatogram is processed by use of an analysis software attached to the device, and an elution curve is obtained by creating an integral curve (curve of accumulated eluted amount with respect to elution temperatures) from a peak area at each elution temperatures and thereafter differentiating the integral curve.

A H/W ratio is calculated from a height (H: %) of a peak with the strongest peak strength and a width (W: ° C.) at half the height of the peak, each in an elution curve as shown in FIG. 1. Moreover, a molecular weight distribution (Mw/Mn) of a whole of eluted components is calculated separately by the analysis software attached to the device.

It is normally preferable that the polypropylene random copolymer resin used in the present invention is melted in advance by an extruding machine, a kneader, a Banbury mixer, a roller, or the like, and processed into polypropylene resin particles of a preferable shape such as a cylinder shape, oval shape, spherical shape, a cubical shape, a cuboid shape, or like shape, so as to be easily used for production of expanded particles.

It is preferable that the resin particles are sized so that one particle weighs not less than 0.1 mg but not more than 30 mg, and more preferably not less than 0.3 mg but not more than 10 mg.

The weight of one particle of the resin particles is an average weight of the resin particles obtained by randomly gathering 100 particles of the resin particles, measuring a total weight thereof and then obtaining an average weight per particle; the weight thereof is expressed as mg per particle.

In a case where a hydrocarbon expanding agent such as propane, butane, pentane, hexane, or the like is used as an expanding agent in the present invention, it is preferable to add an inorganic substance which serves as a cell nucleating agent, such as talc, silica, calcium carbonate or the like by an amount of not less than 0.005 parts by weight to 0.5 parts by weight with respect to 100 parts by weight of the polypropylene random copolymer resin.

In a case where an inorganic expanding agent such as air, nitrogen, carbon dioxide gas, water or the like is used as an expanding agent in the present invention, it is preferable to add the inorganic substance and/or a water-absorbent substance to the polypropylene random copolymer resin.

In the present invention, a water-absorbent substance is a substance which is to be added to the resin particles to make the resin be capable of absorbing water into the resin particle when the resin particles are in contact with water or when the expanding agent is impregnated to the resin particles with use of a water dispersion medium. Specific examples of the water-absorbent substance include water-soluble inorganic substances such as sodium chloride, calcium chloride, magnesium chloride, borax, zinc borate and the like; specific block polymer whose hydrophilic segment is polyethylene glycol or polyether (e.g. PELESTAT, manufactured by Sanyo Chemical Industries, Ltd.); hydrophilic polymers of (a) alkaline metal salts of a ethylene-(meth)acrylate copolymer, (b) alkaline metal salts of a butadiene-(meth)acrylate copolymer, (c) alkaline metal salts of carboxylated nitrile rubber, (d) alkaline metal salts of a isobutylene-maleic anhydride copolymer, and (e) alkaline metal salts of poly(meth)acrylate; polyalcohols such as ethylene glycol, glycerin, pentaerythritol, and isocyanuric acid; and melamine. These water-soluble inorganic substances, hydrophilic polymers, polyalcohols, and the like may be used solely, or two or more types thereof may be used in combination.

How much the water-absorbing substance is added differs depending on a target expansion ratio, a used expanding agent, and a used type of water-absorbing substance, and therefore cannot be unconditionally described. However, in a case where the water-soluble inorganic substance, the polyalcohols, or melamine is to be used, it is preferable that the amount of the water-absorbent substance added is not less than 0.01 parts by weight but not more than 2 parts by weight with respect to 100 parts by weight of the polypropylene random copolymer resin, and in a case where the hydrophilic polymer is to be used, it is preferable to add not less than 0.05 parts by weight but not more than 5 parts by weight with respect to 100 parts by weight of the polypropylene random copolymer resin.

It is preferable that an average cell diameter of the expanded polypropylene copolymer resin particles according to the present invention is not less than 50 μm but not more than 1000 μm, and is further preferably not less than 100 μm but not more than 500 μm. If the average cell diameter is less than 50 μm, a shrinkage ratio of the obtained in-mold expansion-molded polypropylene resin article may increase or a surface appearance may decrease. If the average cell diameter exceeds 1000 μm, the cell diameter can easily become ununiform, and the ratio of the expanded particles also tend to largely vary.

In the present invention, the polypropylene random copolymer resin may add, other than the inorganic substance or the water-absorbent substance, an antistatic agent, a pigment, a fire-retardant modifying agent, an electrically-conductive modifying agent and the like if necessary. In this case, it is usually preferable to add these additives into molten resin during a process of preparing the polypropylene resin particles.

How the expanded polypropylene copolymer resin particles of the present invention are produced is not particularly limited. However, it is preferable to produce the expanded polypropylene copolymer resin particles by a method as follows: in a pressure-resistant container, polypropylene copolymer resin particles are dispersed into water together with a dispersing agent, a dispersive auxiliary agent or the like in the presence of an expanding agent; the polypropylene copolymer resin particles are heated under pressure to a predetermined expansion temperature; and after the expanding agent is impregnated into the resin particles, the dispersed product inside the pressure-resistant container is released to a low pressure area and expanded while maintaining a constant temperature and pressure inside the container.

In the present invention, at a time when the dispersed product is released to a low pressure area from within the pressure-resistant container, it is preferable that the pressure-resistant container has an inner temperature (hereinafter, may be referred to as "expansion temperature") around the melting point of the propylene copolymer resin particles, of generally not less than Tm−15 (° C.) but not more than Tm+15 (° C.), where Tm (° C.) is a melting point of the polypropylene copolymer resin particles. However, note that the temperature varies depending on a type of resin and a type of expanding agent.

In a case where expanded polypropylene copolymer resin particles of a high expansion ratio are to be obtained, a so-called two-step expansion method may be employed. The two-step expansion method is carried out as follows: the expanded polypropylene copolymer resin particles are once obtained by the above-described method; the expanded particles is impregnated with inert gas such as air to provide expansion force; and thereafter the expanded particles are heated to cause the particles to expand larger.

Examples of the expanding agent used in the present invention, with which the polypropylene resin particles are impregnated, include hydrocarbon expanding agents represented by aliphatic hydrocarbons such as propane, normal butane, isobutane, normal pentane, isopentane, and hexane; inorganic gases such as air, nitrogen, and carbon dioxide gas; and inorganic expanding agents such as water. These expanding agents may be used solely, or two or more types thereof may be used in combination. Among the expanding agents, it is preferable to use carbon dioxide gas, water, and isobutane that allows for expansion by a high ratio.

Although an amount of the expanding agent to be added varies in the present invention depending on a used resin, a used expanding agent, and a preferred expansion ratio, the amount of the expanding agent is determined as appropriate in accordance with the preferred expansion ratio of the expanded polypropylene copolymer resin particles. It is preferable that the used amount of the expanding agent is not less than 1 part by weight but not more than 60 parts by weight, with respect to 100 parts by weight of the polypropylene resin particles.

The pressure-resistant container used in producing the expanded polypropylene copolymer resin particles is not particularly limited, as long as the container can tolerate its inner pressure and inner temperature at the time of producing the expanded polypropylene copolymer resin particles. For example, an autoclave pressure-resistant container may be used.

Examples of the dispersing agent which may be used in the present invention include inorganic dispersing agents such as tribasic calcium phosphate, tribasic magnesium phosphate, basic magnesium carbonate, calcium carbonate, basic zinc carbonate, aluminium oxide, iron oxide, titanium oxide, alumino-silicate, barium sulfate, and kaolin. These dispersing agents may be used solely, or two or more types thereof may be used in combination.

Dispersive auxiliary agents used in the present invention include surfactants and the like, such as sodium dodecylbenzenesulfonate, sodium alkyl sulfonate, sodium $\alpha$-olefin sulfonate, and the like. These may be used solely, or two or more types thereof may be used in combination. Among these agents, a preferable combination of the dispersing agent and the dispersive auxiliary agent is a combination of tribasic calcium phosphate and sodium alkyl sulfonate.

An amount of the dispersing agent and dispersive auxiliary agent to be added varies in the present invention depending on the type the dispersing agent and the dispersive auxiliary agent, and further on a type and amount of the used polypropylene random copolymer resin. In a case where a feed ratio of the polypropylene resin particles to water is in a range of 1/3 to 1/1, it is preferable that the dispersing agent is used by an amount of not less than 0.1 parts by weight but not more than 5 parts by weight with respect to 100 parts by weight of water, and is preferable that the dispersive auxiliary agent is used by an amount of not less than 0.001 parts by weight but not more than 0.1 parts by weight with respect to 100 parts by weight of water. The amount as described above is preferable since it allows for securing dispersion stability, and not hindering the fusing of the expanded particles in the in-mold expansion molding because of its difficulty for the dispersing agent to be attached to a surface of the obtained expanded particles.

It is preferable that the expanded polypropylene copolymer resin particles of the present invention has two melting peaks, a low temperature peak and a high temperature peak, in a DSC curve obtained by performing measurements with a differential scanning calorimeter (DSC) while heating a sample of 3 mg to 6 mg from 40° C. to 220° C. at a rate of 10° C./min. By having the expanded polypropylene copolymer resin particles have two melting peaks, the range of molding conditions such as a range of the molding heating vapor pressure when the expanded polypropylene copolymer resin particle is subjected to the in-mold expansion molding tends to be more broad.

It is preferable that a DSC ratio in the expanded polypropylene copolymer resin particles of the present invention is in a range of not less than 10% but not more than 50%. If the DSC ratio is less than 10%, the percentage of closed cells of the expanded polypropylene copolymer resin particles is low, which tends to cause a greater in-mold expansion-molded article deformation rate. If the DSC peak ratio exceeds 50%, there may be cases where a secondary expansion force is insufficiently achieved while carrying out the in-mold expansion molding to the expanded polypropylene copolymer resin particles. In this case, an obtained in-mold expansion-molded article may be like a millet brittle, in which the expanded particles thereof are fused weakly to each other. The DSC ratio is a ratio ($QH/(QH+QL) \times 100$) of the quantity of heat at a melting peak on the higher-temperature side, which ratio is found from a quantity of heat $QL$ at a melting peak on a lower-temperature side and a quantity of heat $QH$ at a melting peak on a higher-temperature side, where the quantity of heat $QL$ at the melting peak on the lower-temperature side is the quantity of heat enclosed by (i) the melting peak on the lower-temperature side and (ii) a tangent, to the DSC curve, which extends from a maximum point between the melting peak on the lower-temperature side and the melting peak on the higher-temperature side to a base line from which melting starts, and the quantity of heat $QL$ at the melting peak on the lower-temperature side is the quantity of heat enclosed by (i) the melting peak on the lower-temperature side and (ii) a tangent, to the DSC curve, which extends from a maximum point between the melting peak on the lower-temperature side and the melting peak on the higher-temperature side to a base line from which melting starts.

The expanded polypropylene copolymer resin particles of the present invention are made into an in-mold expansion-molded polypropylene resin article, by carrying out in-mold expansion molding. Conventionally known methods can be used in a case where the expanded polypropylene copolymer resin particles is to be used for the in-mold expansion molding, such as (a) a method in which the expanded particles are used as they are; (b) a method impregnating inorganic gas such as air into the expanded particles in advance to provide expanding ability; and (c) a method in which expanded particles are compressed and filled in a mold at a state in which inner pressure of the particles is increased, to mold.

For example, in the case of (b), an in-mold expansion-molded polypropylene resin article is obtained as follows: the expanded particles in the pressure-resistant container are applied with pressure by air in advance, and air is injected into the expanded polypropylene copolymer resin particles to provide the resin particles with expansion ability. Thereafter, the expanded resin particles are filled in a molding space constructed of two molds that can be closed but cannot be sealed. The expanded resin particles are molded by being heated with water vapor that serves as a heating medium, with a molding heating vapor pressure of around 0.1 to 0.4 MPa (gage pressure) for about 3 to 30 seconds, to fuse the expanded polypropylene copolymer resin particles together. Thereafter, the mold is cooled by water cooling to a degree in which deformation of the in-mold expansion-molded article which has been taken out of the mold is prevented.

It is preferable that the in-mold expansion-molded polypropylene resin article has a density of not less than 10 $kg/m^3$ but not more than 300 $kg/m^3$, and is more preferable to be not less than 15 $kg/m^3$ but not more than 150 $kg/m^3$. The density of the in-mold expansion-molded polypropylene resin article is calculated from a dry weight (W: kg) of the in-mold expansion-molded polypropylene resin article and an immersed volume (V: m$^3$).

EXAMPLES

The following description specifically explains the present invention with reference to Examples. However, the present invention is not limited to these Examples.

Measurements and evaluations in the present Examples were carried out as described below.

<Measurement of Melting Point>

A DSC curve was obtained as follows with use of a differential scanning calorimeter (DSC 6200, manufactured by Seiko Instruments Inc.): 3 mg to 6 mg of polypropylene copolymer resin particles were heated from 40° C. to 220° C. at a rate of 10° C./min, to melt the resin particles; thereafter, the temperature of the resin particles were lowered from 220° C. to 40° C. at a rate of 10° C./min, to crystallize the resin particles. The resin particles were again heated from 40° C. to 220° C. at a rate of 10° C./min. A melting peak temperature in the second heat temperature rise on the DSC curve served as the melting point.

<DSC Ratio>

A DSC ratio (a ratio of quantity of heat at a melting peak on a higher-temperature side) (QH/(QL+QH)×100), which is found from a quantity of heat QL at a melting peak on a lower-temperature side and a quantity of heat QH at a melting peak on a higher-temperature side, was calculated with use of a differential scanning calorimeter (DSC 6200, manufactured by Seiko Instruments Inc.). The quantity of heat QL at the melting peak on the lower-temperature side and the quantity of heat QH at the melting peak at the higher-temperature side are of melting peaks on a DSC curve, which is obtained by heating 3 mg to 6 mg of the obtained expanded polypropylene copolymer resin particles from 40° C. to 220° C. at a rate of 10° C./min. The quantity of heat QL at the melting peak on the lower-temperature side is the quantity of heat enclosed by (i) the melting peak on the lower-temperature side and (ii) a tangent, to the DSC curve, which extends from a maximum point between the melting peak on the lower-temperature side and the melting peak on the higher-temperature side to a base line from which melting starts. The quantity of heat QH at the melting peak on the higher-temperature side is quantity of heat enclosed by (i) the melting peak at the higher-temperature side and (ii) a tangent, to the DSC curve, which extends from the maximum point between the melting peak on the lower-temperature side and the melting peak on the higher-temperature side to a base line at which the melting ends.

<Flexural Modulus of Polypropylene Resin>

A flexural test measurement bar (width 12 mm, length 127 mm) having a thickness of 6.4 mm was prepared with dried polypropylene copolymer resin which was dried for 6 hours at 80° C., by use of a 35 t injection molding machine having a cylinder temperature of 200° C. and a mold temperature of 30° C. After an elapse of 1 week, a bending test was carried out in accordance with ASTM D790 under conditions of a distance between fulcrums of 100 mm and a test velocity of 5 mm/min, and the flexural modulus was measured.

<Measurement of Eluted Amount by Cross Fractionation Chromatography (CFC), Weight-Average Molecular Weight, and Number-Average Molecular Weight>

An eluted amount and an Mw/Mn ratio of the polypropylene random copolymer resin were measured by the following CFC apparatus under the following measurement conditions.

More specifically, a sample solution (o-dichlorobenzene solution of polypropylene random copolymer resin) was injected into a sample solution injection section having a temperature of 135° C., and thereafter, the sample solution was cooled in the TREF section from 135° C. to 0° C. at a cooling rate of 1° C./min, to cause crystallization of the sample inside the TREF section. Subsequently, the temperature of the TREF section was kept at 0° C. for 60 minutes. The sample was then successively eluted at the following elution group temperatures and was guided from the TREF section to the GPC column. Thereafter, a GPC chromatogram (molecular weight distribution) was obtained by use of an infrared detector.

The obtained GPC chromatogram was processed by use of an analysis software attached to the apparatus. An integral curve (accumulated eluted amount curve with respect to elution temperatures) was generated from a peak area at each of the elution temperatures, and this integral curve was differentiated to obtain an elution curve.

In the elution curve as shown in FIG. 1, a ratio (H/W) of a height (H: %) of the strongest peak strength to a width (W: ° C.) in half the height of the peak was calculated.

Moreover, with the analysis software attached to the apparatus, a molecular weight distribution (Mw/Mn) of a whole of eluted components was separately calculated.

Device: Cross fractionation Chromatograph CFC T-150A (manufactured by Mitsubishi Petrochemical Co., Ltd.)
Detector: Infrared spectrophotometer 1ACVF (manufactured by MIRAN)
Detection wavelength: 3.42 μm
GPC column: Shodex AT-806MS×3 columns (manufactured by Showa Denko K.K.)
Column temperature: 135° C.
Column calibration: monodispersed polystyrene (manufactured by Tosoh Corporation)
Molecular weight calibration method: universal calibration/polystyrene conversion
Eluting solvent: o-dichlorobenzene
Flow rate: 1.0 mL/min.
Sample concentration: 30 mg/10 mL
Injection amount: 500 μL
Temperature lowering time: 135 minutes (135° C. to 0° C.: crystallization rate 1° C./min), thereafter kept for 60 minutes
Elution groups: 0, 20, 40, 50, 60, 70, 75, 80, 83, 86, 89, 92, 95, 98, 101, 104, 106, 108, 110, 112, 114, 116, 118, 120, 122, 124, 126, 130, 135° C. (29 fractions)

<Expansion Ratio of Expanded Particles>

The weight w (g) of the expanded polypropylene copolymer resin particles having a bulk volume of approximately 50 cm$^3$ and an ethanol immersed volume v (cm$^3$) were found, and an expansion ratio was calculated from a density d (g/cm$^3$) of the resin particles yet to be subjected to expansion:

$$\text{Expansion ratio} = d \times v / w$$

<Moldability Evaluation>

Figure 2:
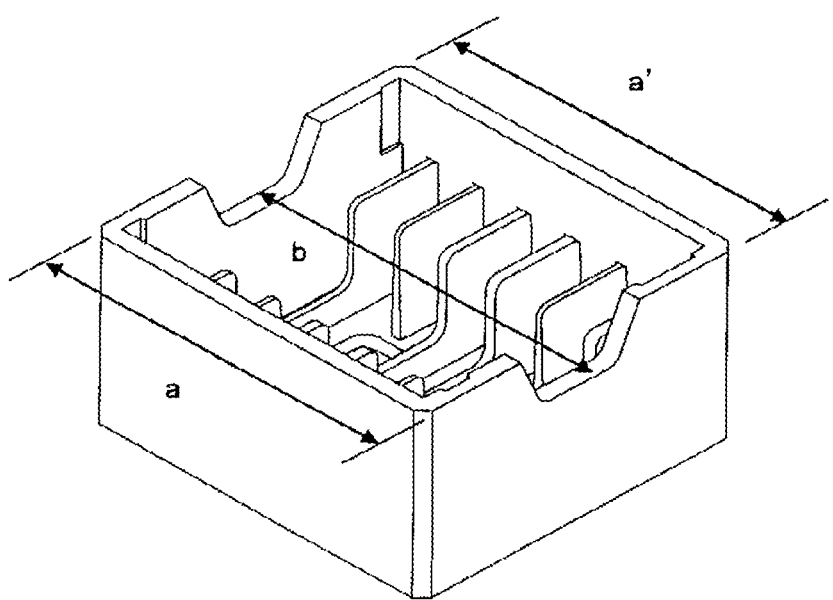
FIG. 2 is a view illustrating a shape of an in-mold expansion-molded polypropylene resin article obtained by carrying out in-mold expansion molding in Examples.
Figure 3:
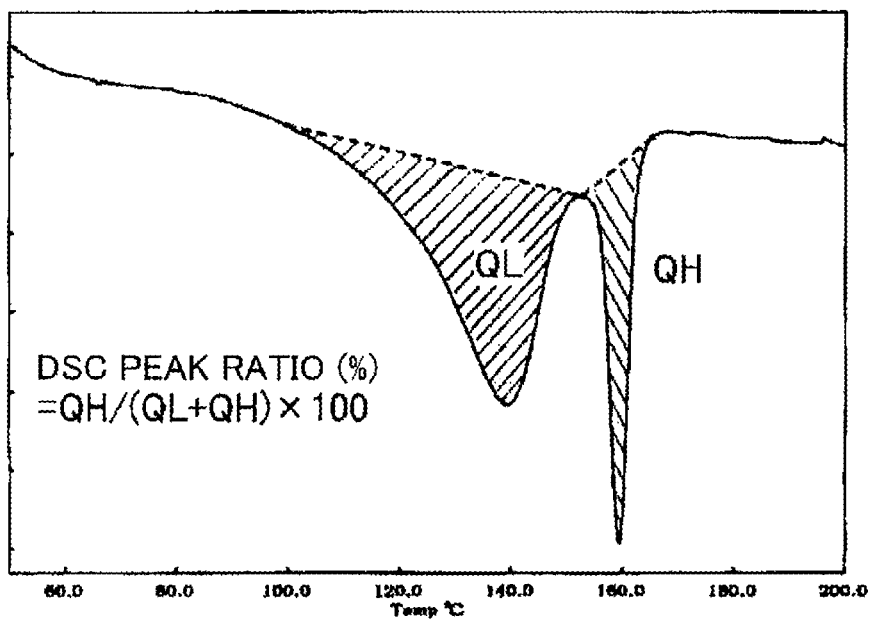
FIG. 3 illustrates an example of a DSC curve obtained by measuring, with a differential scanning calorimeter (DSC), the expanded polypropylene copolymer resin particles while the expanded polypropylene copolymer resin particles are heated from 40° C. to 220° C. at a rate of 10° C./min. QL is the quantity of heat at the melting peak on the lower-temperature side enclosed by (i) the melting peak on the lower-temperature side and (ii) a tangent, to the DSC curve, which extends from a maximum point between the melting peak on the lower-temperature side and the melting peak on the higher-temperature side to a base line from which melting starts. QH is the quantity of heat at the melting peak on the higher-temperature side enclosed by (1) the melting peak on the higher-temperature side and (ii) a tangent, to the DSC curve, which extends from the maximum point between the melting peak on the lower-temperature side and the melting peak on the higher-temperature side to a base line at which the melting ends.

For evaluation of moldability, an in-mold expansion-molded article of a shape as illustrated in FIG. 2 (external dimension of designed molded article: 327 mm×353 mm×height 180 mm, thickness of 18 mm) was produced by in-mold expansion molding in a level in which a molding heating vapor pressure was varied in a range of 0.15 MPa to 0.35 MPa (gage pressure).

An obtained in-mold expansion-molded article was left to stand for 1 hour at room temperature, was dry cured for 3 hours at a constant temperature of 75° C., was taken out again into room temperature and was left to stand for a further 1 hour. Thereafter, fusing properties, surface properties, dimension shrinkage rate, molding heating temperature range of the article were evaluated.

(1) Fusing Properties
To the obtained in-mold expansion-molded polypropylene resin article, a cut of approximately 3 mm was made in a thickness direction of the in-mold expansion-molded article with a cutter knife. Thereafter, the in-mold expansion-molded article was ruptured by hand from the cut part. This ruptured plane was observed to find a proportion (fuse rate) of ruptured expanded particles to the number of expanded particles that construct the rupture plane. Evaluations were made as follows:
G: 60% or more of expanded particles were ruptured; and
P: less than 60% of expanded particles were ruptured.
(2) Molding Heating Temperature Range
Among the molding heating vapor pressures which satisfy the fusing properties as 60% or more in the fusing property test, a lowest molding heating vapor pressure (gage pressure) is referred to as a "lowest molding pressure". Meanwhile, of the in-mold expansion-molded article (FIG. 2), (i) an average value A of dimension a and dimension a' (upper sides in its longitudinal direction) and (ii) a dimension b (along the center in its longitudinal direction) were measured, and a molded article deformation rate was calculated as follows: [(A−b)/A]×100(%). Further, from among the molding heating vapor pressure which maintains a molded article deformation rate of less than 2%, a highest molding heating vapor pressure (gage pressure) is referred to as a "highest molding pressure". The molding heating temperature range was obtained by a difference between the highest molding pressure and the lowest molding pressure. The larger the difference between the two, the more preferable it is. The molding heating temperature range was determined by the following standard:
G: difference between highest molding pressure and lowest molding pressure being 0.05 MPa or more
P: difference between highest molding pressure and lowest molding pressure being less than 0.05 MPa.
(3) Surface Properties
Several in-mold expansion-molded polypropylene resin articles were produced by the in-mold forming with a molding pressure between the lowest molding pressure and the highest molding pressure. Surface states thereof were observed by eyesight, to comprehensively evaluate the articles based on the following standards:
E: only a few wrinkles and intergranular voids were observed, and were fine;
G: some wrinkles and intergranular voids were observed, however good; and
P: wrinkles and surface sink were observed, and had poor external appearance.
(4) Dimension Shrinkage Rate
Several in-mold expansion-molded polypropylene resin articles (FIG. 2) were produced by the in-mold forming with a molding pressure between the lowest molding pressure and the highest molding pressure. An average value A of dimension a and dimension a' (upper side in the longitudinal direction) of the in-mold polypropylene resin articles (FIG. 2) were calculated, and shrinkage rates with respect to the mold dimension (353 mm) were calculated and evaluated as below:
G: shrinkage rate of less than 3%;
S: shrinkage rate of not less than 3% but less than 5%; and
P: shrinkage rate of 5% or more.
<50% Compression Strength of Expansion-Molded Article>
After washing the obtained expanded polypropylene resin particles with hydrochloric acid solution whose pH was 1, the resin particles were dried at 75° C. and were impregnated with pressured air in a pressure-resistant container so that an inner pressure of the particles became 0.2 MPa. Thereafter, in-mold expansion molding (molded article density of 20 kg/m$^3$) was carried out by an expanded-polyolefin molding machine (P-150N, manufactured by Toyo Machinery 86 Metal Co., Ltd.) and with a plate die (length 400 mm×width 300 mm×thickness 60 mm), in a level in which the heating vapor pressure was varied within a range of 0.20 to 0.35 MPa (gage pressure).
An obtained plate in-mold expansion-molded article was left to stand at room temperature for 1 hour, then dry cured for 15 hours at a constant temperature of 75° C. The article (having a fuse rate of around 80%, of a level with few deformation; in Examples 1 and 2, molded by a molding vapor pressure of 0.28 MPa, in Example 3, molded by a molding vapor pressure of 0.26 MPa, in Comparative Example 1, molded by a molding vapor pressure of 0.24 MPa, and in Comparative Example 2, molded by a molding vapor pressure of 0.30 MPa) was further left to stand for 1 week at room temperature. Thereafter, compression strength measurement was carried out to the molded article in the following conditions.
A test piece having a size of a length 50 mm×width 50 mm×thickness 25 mm was cut out from the obtained in-mold expansion-molded polypropylene resin article. Compression stress (MPa) of the test piece was measured at a time of 50% compression at a time when the test piece was compressed at a rate of 10 mm/min, with a tensile-compression testing device [TG-20KN, manufactured by Minebea Co., Ltd] in accordance with NDS-Z0504.

Example 1

Preparation of Polypropylene Resin Particles

As the polypropylene random copolymer resin, 100 parts by weight of propylene-ethylene random copolymer was used, which propylene-ethylene random copolymer had an ethylene content of 3.5% by weight, a melting point of 139° C., an MFR of 8.3 g/10 min, a flexural modulus of 880 MPa, a H/W ratio obtained by CFC measurement of 4.3, and Mw/Mn of 5.3. After 0.1 parts by weight of talc [PKS, manufactured by Hayashi-Kasei Co., Ltd.] as the cell nucleating agent and 0.5 parts by weight of polyethylene glycol [PEG#300, manufactured by Lion Corporation] as a water-absorbent were blended to the polypropylene-ethylene random copolymer, the mixture was melted and kneaded in a 50 mm single-axis extruding machine [20VSE-50-28, manufactured by Osaka Seiki Kosaku K.K.] at an extruding temperature of 200° C. An obtained molten and kneaded resin was extruded from a round die into strands, and the resin was water cooled. Thereafter, the resin was cut by a pelletizer. This prepared polypropylene resin particles of which a weight of one particle is 1.2 mg/particle.
[Preparation of Expanded Polypropylene Resin Particles]
Into a pressure-resistant autocleave having a capacity of 10 L, 100 parts by weight of the prepared polypropylene resin particles, 200 parts by weight of water, 1.0 parts by weight of tribasic calcium phosphate as a dispersing agent, and 0.05 parts by weight of sodium lauryl sulfonate [LATEMUL PS, manufactured by Kao Corporation] as a dispersive auxiliary agent were poured. While stirring this mixture, 6.25 parts by weight of carbon dioxide gas was added as an expanding agent. The contents in the autocleave were heated to an expanding temperature of 147° C., and thereafter carbon dioxide gas was further added to have the inner pressure of the autocleave be 3.0 MPa (gage pressure). After keeping this state for 30 minutes, a valve on a lower part of the autocleave was opened to release the contents in the autocleave under atmospheric pressure through an aperture orifice of 4.0 mmϕ, to obtain one-step expanded particles. The expansion ratio of the obtained one-step expanded particles was 16 fold, and its DSC ratio was 25%.

An inner pressure of 0.32 MPa was provided to the one-step expanded particles by impregnating the obtained one-step expanded particles with air, and the particles were heated by vapor of 0.06 MPa (gage pressure). This attained expanded particles having an expansion ratio of approximately 30 fold.

[Production of Expansion-Molded Polypropylene Resin Article]

After washing the obtained expanded polypropylene resin particles with hydrochloric acid solution whose pH was 1, the resin particles were dried at 75° C. and were impregnated with pressured air in a pressure-resistant container so that an inner pressure of the particles became 0.2 MPa. Thereafter, in-mold expansion molding was carried out by an expanded polyolefin molding machine (P-150N, manufactured by Toyo Machinery & Metal Co., Ltd.) to produce an in-mold expansion-molded article of a shape illustrated in FIG. 2 (external dimension of designed article: 327 mm×353 mm×height 180 mm, thickness of 18 mm), in a level in which the heating vapor pressure was varied in a range of 0.15 to 0.35 MPa (gage pressure). An obtained in-mold expansion-molded article was left to stand at room temperature for 1 hour, was dry cured for 3 hours at a constant temperature of 75° C., was taken out again into room temperature and was left to stand for a further 1 hour. Thereafter, the molded article was evaluated. Results obtained of the evaluation are as shown in Table 1.

Example 2

Other than that a propylene-ethylene random copolymer having an ethylene content of 3.5 weight %, a melting point of 139° C., an MFR of 6.3 g/10 min, a flexural modulus of 880 MPa, a H/W ratio obtained by CFC measurement of 6.0 and a Mw/Mn of 5.9 was used as the polypropylene random copolymer resin, preparation of expanded resin particles and molding evaluations thereof were carried out as with Example 1. Results obtained of the evaluations are as shown in Table 1.

Example 3

Other than that a propylene-ethylene random copolymer having an ethylene content of 4.1 weight %, a melting point of 134° C., an MFR of 7.0 g/10 min, a flexural modulus of 680 MPa, a H/W ratio obtained by CFC measurement of 3.3 and the Mw/Mn of 5.1 was used as the polypropylene random copolymer resin, preparation of expanded resin particles and the molding evaluations thereof were carried out as with Example 1. Results obtained of the evaluations are as shown in Table 1.

Comparative Example 1

Other than that a propylene-ethylene random copolymer having an ethylene content of 4.0 weight %, a melting point of 136° C., an MFR of 7.0 g/10 min, a flexural modulus of 650 MPa, a H/W ratio obtained by CFC measurement of 9.5 and the Mw/Mn of 3.4 was used as the polypropylene random copolymer resin, preparation of expanded resin particles and the molding evaluations thereof were carried out as with Example 1. Results obtained of the evaluations are as shown in Table 1.

Comparative Example 2

Other than that a propylene-ethylene random copolymer having an ethylene content of 3.4 weight %, a melting point of 142° C., an MFR of 7.0 g/10 min, a flexural modulus of 860 MPa, a H/W ratio obtained by CFC measurement of 9.6 and the Mw/Mn of 5.0 was used as the polypropylene random copolymer resin, preparation of expanded resin particles and the molding evaluations were carried out as with Example 1. Results obtained of the evaluations are as shown in Table 1.

TABLE 1

| | | Ex. 1 | Ex. 2 | Ex. 3 |
|---|---|---|---|---|
| Base resin | Polymerization catalyst | Ziegler | Ziegler | Ziegler |
| | Copolymerization component type | ethylene | ethylene | ethylene |
| | Copolymerization component content (weight %) | 3.5 | 3.5 | 4.1 |
| | H/W ratio (from CFC measurement) | 4.3 | 6.0 | 3.3 |
| | Mw/Mn (from CFC measurement) | 5.3 | 5.9 | 5.1 |
| | MFR (g/10 min) | 8.3 | 6.3 | 7.0 |
| | Melting point mp (° C.) | 139 | 139 | 134 |
| | Flexural modulus (MPa) | 880 | 880 | 680 |
| Expanded particles | Expanding agent | $CO_2$ | $CO_2$ | $CO_2$ |
| | Expanding temperature (° C.) | 147 | 148 | 140 |
| | One-step expansion ratio (fold) | 16 | 14 | 13 |
| | One-step expanded particle DSC ratio (%) | 25 | 26 | 26 |
| | Two-step expansion ratio (fold) | 30 | 30 | 30 |
| In-mold expansion-molded article | Lowest molding pressure having 60% fusing (MPa) | 0.20 | 0.22 | 0.18 |
| | Deformation limit highest molding pressure (MPa) | 0.32 | 0.34 | 0.30 |
| | Molding heating vapor pressure range | G | G | G |
| | Surface properties | E | G | G |
| | Dimension shrinkage rate | G | G | G |
| | 50% compression strength (MPa) (Molded article density of 20 kg/m³) | 0.17 | 0.17 | 0.16 |

| | | C. Ex. 1 | C. Ex. 2 |
|---|---|---|---|
| Base resin | Polymerization catalyst | Ziegler | Ziegler |
| | Copolymerization component type | ethylene | ethylene |
| | Copolymerization component content (weight %) | 4.0 | 3.4 |
| | H/W ratio (from CFC measurement) | 9.5 | 9.6 |
| | Mw/Mn (from CFC measurement) | 3.4 | 5.0 |
| | MFR (g/10 min) | 7.0 | 7.0 |
| | Melting point mp (° C.) | 136 | 142 |
| | Flexural modulus (MPa) | 650 | 860 |
| Expanded particles | Expanding agent | $CO_2$ | $CO_2$ |
| | Expanding temperature (° C.) | 143 | 147 |
| | One-step expansion ratio (fold) | 15 | 14 |
| | One-step expanded particle DSC ratio (%) | 23 | 24 |
| | Two-step expansion ratio (fold) | 30 | 30 |
| In-mold expansion-molded article | Lowest molding pressure having 60% fusing (MPa) | 0.20 | 0.28 |
| | Deformation limit highest molding pressure (MPa) | 0.24 | 0.32 |
| | Molding heating vapor pressure range | P | P |
| | Surface properties | G | G |
| | Dimension shrinkage rate | S | S |
| | 50% compression strength (MPa) (Molded article density of 20 kg/m³) | 0.15 | 0.16 |

Note:
Ex. is an abbreviation of Example

Note:
C. Ex. is an abbreviation of Comparative Example

A comparison of Examples 1 and 2 with Comparative Example 2 show that although the melting point of Examples 1 and 2 are 139° C. and is lower than the melting point of Comparative Example 2 being 142° C., the flexural modulus of the resin of each of Examples 1 and 2 is high, and compression strength of the in-mold expansion-molded polypropylene resin article of each of Examples 1 and 2 is higher than that of Comparative Example 2. Moreover, a comparison of Example 3 with Comparative Example 1 shows that although the melting point of Example 3 is 134° C. which is lower than the melting point of Comparative Example 1, the flexural modulus of the resin is higher in Example 3, and the compression strength of the in-mold expansion-molded polypropylene resin article of Example 3 is also higher than that of Comparative Example 1. Moreover, in the Examples, the molding heating temperature ranges are remarkably broader than those of the Comparative Examples, and the surface property and dimension shrinkage rate thereof also excelled.

The invention claimed is:

1. An expanded polypropylene copolymer resin particle whose base resin is a polypropylene random copolymer resin having a melting point of not less than 120° C. but not more than 145° C., the base resin having a ratio H/W of not more than 8, where H (%) is a maximum height of an elution peak and W (° C.) is a peak width at half the height of the peak, each in an elution curve obtained from an eluted amount measured by cross fractionation chromatography, and a ratio (Mw/Mn) of weight-average molecular weight (Mw) to number-average molecular weight (Mn) in a molecular weight distribution measurement of a whole of eluted components being not less than 3.5.

2. An in-mold expansion-molded polypropylene resin article obtained by having an expanded polypropylene copolymer resin particle as set forth in claim 1 be subjected to in-mold expansion molding, the in-mold expansion-molded polypropylene resin article having a density of not less than 10 kg/m$^3$ but not more than 300 kg/m$^3$.

* * * * *